United States Patent [19]

Sato et al.

[11] 4,338,426
[45] Jul. 6, 1982

[54] INTERMEDIATE, COPOLYMER RESIN AND PRODUCTION THEREOF

[75] Inventors: Hidetaka Sato; Shunichiro Uchimura; Hiroshi Suzuki; Daisuke Makino, all of Hitachi, Japan

[73] Assignee: Hitachi Chemical Company, Ltd., Tokyo, Japan

[21] Appl. No.: 290,566

[22] Filed: Aug. 6, 1981

[30] Foreign Application Priority Data

Aug. 27, 1980 [JP] Japan .............................. 55-118946

[51] Int. Cl.$^3$ ............................................. C08G 77/04
[52] U.S. Cl. ....................................... 528/26; 528/21; 528/23; 528/28; 528/38; 556/419; 556/423
[58] Field of Search ..................... 528/26, 28, 38, 21, 528/23; 556/419, 423

[56] References Cited

U.S. PATENT DOCUMENTS

| | | | |
|---|---|---|---|
| 3,740,305 | 6/1973 | Hoback et al. | 161/183 |
| 4,017,340 | 4/1977 | Yerman | 427/95 |
| 4,030,948 | 6/1977 | Berger | 148/186 |
| 4,051,163 | 9/1977 | Berger et al. | 556/419 |
| 4,139,547 | 2/1979 | Berger | 556/423 |

Primary Examiner—Melvyn I. Marquis
Attorney, Agent, or Firm—Craig and Antonelli

[57] ABSTRACT

A polyimide-isoindroquinazolinedione-silicone copolymer resin produced by reacting (a) a diaminoamide, (b) a diaminosiloxane, (c) a diamine, and (d) a tetracarboxylic acid dianhydride to give a polyamide acid-silicone intermediate, which is then subjected to dehydration and ring closure, is excellent particularly in adhesiveness, moisture resistance, wear resistance and heat resistance. The polyamide acid-silicone intermediate is stable in the form of a varnish and usuable commercially as a raw material for the polyimide-isoindroquinazolinedione-silicone copolymer resin.

16 Claims, No Drawings

INTERMEDIATE, COPOLYMER RESIN AND PRODUCTION THEREOF

This invention relates to intermediates (or prepolymers), copolymer and processes for production thereof.

Polyimide resins obtained by reacting a diamine and a tetracarboxylic acid dianhydride are now used as electrical insulating material because of their excellent heat resistance. But the polyimide resins are poor in adhesiveness to substrates and particularly poor in adhesiveness to glass substrates. Various modifications of polyimide resins have been proposed but not sufficient.

This invention provides a polyimide-isoindroquinazolinedione-silicone copolymer resin having repeating units of imide rings and isoindroquinazolinedione rings or homologous rings derived from isoindroquinazolinedione rings and siloxane structure in the skelton.

This invention also provide a polyamide acid-silicone intermediate (or precursor of the copolymer resin) obtained by reacting (a) a diaminoamide compound of the formula:

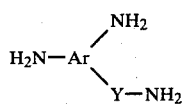  (I)

wherein Ar is an aromatic residue such as

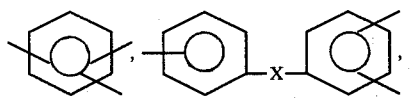

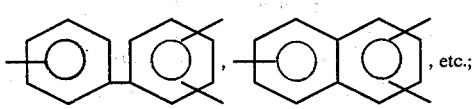, etc.;

Y is SO$_2$ or CO, and one of amino groups and the Y—NH$_2$ group are positioned at ortho position each other, (b) a diaminosiloxane,
(c) a diamine, and
(d) a tetracarboxylic acid dianhydride, and a process for production thereof.

This invention further provides a process for producing a polyimide-isoindroquinazolinedione-silicone copolymer resin which comprises reacting (a) a diaminoamide compound of the formula:

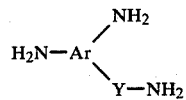  (I)

wherein Ar and Y are as defined above, (b) a diaminosiloxane,
(c) a diamine, and
(d) a tetracarboxylic acid dianhydride, in an inert solvent at a temperature of 80° C. or lower to give a polyamide acid-silicone intermediate, which is then subjected to dehydration and ring closure with heating at a temperature of 350° C. or lower.

The polyimide-isoindroquinazolinedione-silicone copolymer resin of this invention is stable for heat, and excellent in adhesiveness, moisture resistance, wear resistance and also maintains effective properties of polyisoindroquinazolinedione such as stability against heat, of polyimide such as elongation and toughness, and of silicone resin such as adhesiveness and moisture resistance. Therefore, the copolymer resin of this invention can be used for producing molded articles, films, composite materials, and the like and the polyamide acid-silicone intermediate can be used as adhesives, coating materials, varnishes, coating compositions, and coatings to finally give the polyimide-isoindroquinazolinedione-silicone copolymer resin.

The component(a), diaminoamide compounds of the formula (I), includes the following compounds:

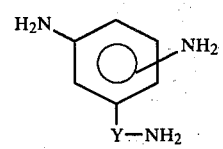  (II)

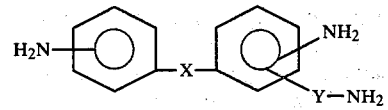  (III)

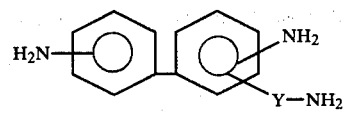  (IV)

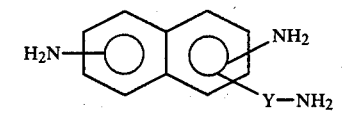  (V)

In the above formulae (II) to (V), Y is SO$_2$ or CO, X is O, CH$_2$, SO$_2$, S or CO, and the Y-NH$_2$ group is positioned at the ortho position as to one NH$_2$ group. Examples of the diaminoamide compounds (I) are
4,4′-diaminodiphenyl ether-3-sulfonamide,
3,4′-diaminodiphenyl ether-4-sulfonamide,
3,4′-diaminodiphenyl ether-3′-sulfonamide,
3,3′-diaminodiphenyl ether-4-sulfonamide,
4,4′-diaminodiphenylmethane-3-sulfonamide,
3,4′-diaminodiphenylmethane-4-sulfonamide,
3,4′-diaminodiphenylmethane-3′-sulfonamide,
3,3′-diaminodiphenylmethane-4-sulfonamide,
4,4′-diaminodiphenylsulfone-3-sulfonamide,
3,4′-diaminodiphenylsulfone-4-sulfonamide,
3,4′-diaminodiphenylsulfone-3′-sulfonamide,
3,3′-diaminodiphenylsulfone-4-sulfonamide,
4,4′-diaminodiphenylsulfide-3-sulfonamide,
3,4′-diaminodiphenylsulfide-4-sulfonamide,
3,3′-diaminodiphenylsulfide-4-sulfonamide,
3,4′-diaminodiphenylsulfide-3′-sulfonamide,
1,4-diaminobenzene-2-sulfonamide,
4,4′-diaminodiphenyl ether-3-carbonamide,
3,4′-diaminodiphenyl ether-4-carbonamide,
3,4′-diaminodiphenyl ether-3′-carbonamide,
3,3′-diaminodiphenyl ether-4-carbonamide,
4,4′-diaminodiphenylmethane-3-carbonamide,
3,4′-diaminodiphenylmethane-4-carbonamide,
3,4′-diaminodiphenylmethane-3′-carbonamide,
3,3′-diaminodiphenylmethane-4-carbonamide,
4,4′-diaminodiphenylsulfone-3-carbonamide, 3,4'-diaminodiphenylsulfone-4-carbonamide,
3,4'-diaminodiphenylsulfone-3'-carbonamide,
3,3'-diaminodiphenylsulfone-4-carbonamide,
4,4'-diaminiodiphenylsulfide-3-carbonamide,
3,4'-diaminodiphenylsulfide-4-carbonamide,
3,3'-diaminodiphenylsulfide-4-carbonamide,
3,4'-diaminodiphenylsulfide-3'-sulfonamide,
1,4-diaminobenzene-2-carbonamide, and the like.

These diaminodiamide compounds can be used alone or as a mixture thereof.

The diaminosiloxane (b) usable in this invention can be represented by the formula:

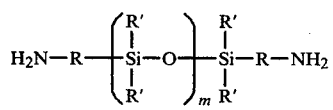

wherein R is a bivalent hydrocarbon group such as alkylene preferably having 1 to 5 carbon atoms; phenylene, phenylene substituted by alkyl, and R' is a monovalent hydrocarbon group such as alkyl preferably having 1 to 5 carbon atoms, phenyl, phenyl substituted by alkyl, each R or R' may be the same or different, and m is an integer of 1 or more.

Examples of these diaminosiloxanes are as follows:

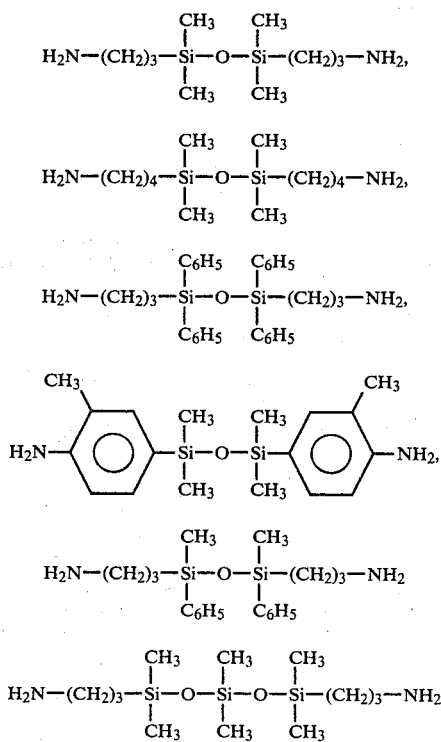

These diaminosiloxanes can be used alone or as a mixture thereof.

These diaminodisiloxanes can be synthesized by the process described in, for example, U.S. Pat. No. 3,185,719.

As the diamine (c), there can be used conventionally used ones, for example, 4,4'-diaminodiphenyl ether, 4,4'-diaminodiphenylmethane, 4,4'-diaminodiphenylsulfone, 4,4'-diaminodiphenylsulfide, benzidine; m-phenylenediamine, p-phenylenediamine, 1,5-napthalenediamine, 2,6-naphthalenediamine, and the like.

These diamines can be used alone or as a mixture thereof.

As the tetracarboxylic acid dianhydride (d), there can be used conventionally used ones, for example, pyromellitic acid dianhydride, 3,3'4,4'-diphenyltetracarboxylic acid dianhydride, 3,3',4,4'-benzophenonetetracarboxylic acid dianhydride, cyclopentanetetracarboxylic acid dianhydride, 1,2,5,6-naphthalenetetracarboxylic acid dianhydride, 2,3,6,7-naphthalenetetracarboxylic acid dianhydride, 2,3,5,6-pyridinetetracarboxylic acid dianhydride, 1,4,5,8-napthalenetetracarboxylic acid dianhydride, 3,4,9,10-perpylenetetracarboxylic acid anhydride, 4,4'-sulfonyldiphthalic acid dianhydride, and the like. These tetracarboxylic acid dianhydrides can be used alone or as a mixture thereof.

In this invention, about equimolar amount of tetracarboxylic acid dianhydride is used per mole of the total of the diaminoamide compound, the diaminosiloxane and the diamine (or a total of the diamine components (a), (b) and (c)).

It is preferable to use 5 to 30% by mole of the diaminoamide compound (a) and 0.1 to 50% by mole of the diaminosiloxane (b) based on the total amounts of the diamine component, i.e., the diaminoamide (a), the diaminosiloxane (b) and the diamine (c).

In this invention, an inert solvent is used. The solvent is not always required to dissolve the above-mentioned four kinds of monomers (a) to (d), but preferable solvents are those which can dissolve the produced polyamide acid-silicone intermediate.

Examples of inert solvents are N-methyl-2-pyrrolidone, N,N-dimethylacetamide, N,N-dimethylformamide, N,N-diethylformamide, dimethyl sulfoxide, hexamethylphosphoramide, tetramethylene sulfone, and the like. These solvents can be used alone or as a mixture thereof.

In a preferred process of this invention, a diaminoamide compound (a), a diaminosiloxane (b), a diamine (c) and a tetracarboxylic acid dianhydride (d) are dissolved in the above-mentioned inert solvent as sufficiently as possible and stirred while maintaining the reaction system preferably at about 80° C. or lower, more preferably near room temperature or lower. Under such conditions, the reaction proceeds rapidly with increasing the viscosity of the reaction system gradually to produce the polyamide acid-silicone intermediate.

The resulting polyamide acid-silicone intermediate is stable in the form of a varnish and can be used as it is in the market to finally give a polyimide-silicone copolymer resin.

When the above-mentioned intermediate is heat treated preferably at 100°–350° C. for about 30 minutes to 5 hours, it is subjected to dehydration and ring closure to give a polyimide-isoindroquinazolinedione-silicone copolymer resin. The dehydration and ring closure reaction can be carried out by using a dehydrating agent such as acetic anhydride, phosphoric acid, or the like. Further, the dehydration and ring closure reaction can also be carried out by coating a varnish containing said intermediate on a substrate such as glass plate or the like, followed by drying and heat-treatment.

This invention is illustrated by way of the following Examples.

EXAMPLE 1

In a 500-ml three-necked flask equipped with a thermometer, a stirrer and a calcium chloride tube, 16.0 g of 4,4'-diaminodiphenyl ether, 2.4 g of 4,4'-diaminodiphenyl ether-3-carbonamide, 2.5 g of 1,3-bis(aminopropyl)-tetramethyldisiloxane and 300 g of N-methyl-2-pyrrolidone were placed and stirred well. To this, 32.2 g of 4,4'-benzophenonetetracarboxylic acid dianhydride was gradually added. After the completion of the addition, the stirring was continued for additional 5 hours. Then, a part of the reaction solution (i.e., a solution of polyamide acid-silicone intermediate produced) was sampled and poured into water to give a precipitate, which was used for measuring a reduced viscosity ($n_{sp}/c$). The reduced viscosity, measured by using dimethyl sulfoxide as a solvent at a concentration of 0.1 g/100 cc solution 25° C., was 0.73 dl/g.

The above-mentioned reaction solution was coated on a glass plate and dried to form a film. The film was heat treated at 300° C. for 2 hours to give the polyimide-isoindroquinazolinedione-silicone copolymer resin film.

The resulting film had good adhesiveness to the glass plate and it was very difficult to peel off the film from the glass plate. The film was not damaged by a pencil of 6 H hardness in the pencil hardness test and showed excellent adhesiveness and wear resistance. On the other hand, when the film was heated in the air, no weight loss was shown until 450° C.; this means the film has excellent heat resistance.

EXAMPLE 2

In the same flask as used in Example 1, 4.9 g of 1,3-bis(aminopropyl)tetramethyldisiloxane, 11.9 g of 4,4'-diaminodiphenylmethane, 4.9 g of 4,4'-diaminodiphenyl ether-3-carbonamide, and 300 g of N,N-dimethylacetamide were placed and stirred well. To this, 10.9 g of pyromellitic acid dianhydride and 16.1 g of 4,4'-benzophenonetetracarboxylic acid dianhydride were added gradually. After the completion of the addition, the stirring was continued for additional 5 hours. Then, a part of the reaction solution was sampled to measure a reduced viscosity ($n_{sp}/c$) under the same conditions as described in Example 1. The reduced viscosity was 0.71 dl/g.

The above-mentioned reaction solution was coated on a glass plate and dried to form a film. The film was heat treated at 300° C. for 2 hours to give the polyimide-isoindroquinazolinedione-silicone copolymer resin film.

The resulting film showed the same excellent adhesiveness, wear resistance and heat resistance as in Example 1.

What is claimed is:
1. A polyimide-isoindroquinazolinedione-silicone copolymer resin produced by reacting
   (a) a diaminoamide compound of the formula:

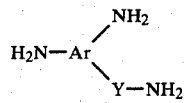

wherein Ar is an aromatic residue, Y is $SO_2$ or CO, and one of amino groups and the Y—$NH_2$ group are positioned at ortho position each other,
   (b) a diaminosiloxane,
   (c) a diamine, and
   (d) a tetracarboxylic acid dianhydride,
to give a polyamide acid-silicone intermediate, which is then subjected to dehydration and ring closure.

2. A polyimide-isoindroquinazolinedione-silicone copolymer resin according to claim 1, wherein the diaminosiloxane is represented by the formula:

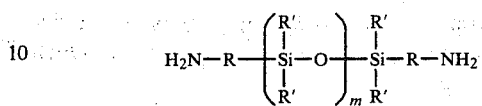

wherein R is a bivalent hydrocarbon group, R' is a monovalent hydrocarbon group, each R and R' may be the same or different, and m is an integer of 1 or more.

3. A polyimide-isoindroquinazolinedione-silicone copolymer resin according to claim 1, wherein the diaminoamide compound is 4,4'-diaminodiphenyl ether-3-carbonamide.

4. A polyimide-isoindroquinazolinedione-silicone copolymer resin according to claim 1, wherein the diamine is 4,4'-diaminodiphenyl ether, 4,4'-diaminodiphenylmethane, or a mixture thereof.

5. A polyimide-isoindroquinazolinedione-silicone copolymer resin according to claim 1, wherein the tetracarboxylic acid dianhydride is 4,4'-benzophenonetetracarboxylic acid dianhydride, pyromellitic acid dianhydride, or a mixture thereof.

6. A polyimide-isoindroquinazolinedione-silicone copolymer resin according to claim 2, wherein the diaminosiloxane is 1,3-bis(aminopropyl)tetramethyldisiloxane.

7. A polyamide acid-silicone intermediate obtained by reacting
   (a) a diaminoamide compound of the formula:

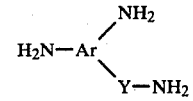

wherein Ar is an aromatic residue, Y is $SO_2$ or CO, and one of amino groups and the Y-$NH_2$ group are positioned at ortho position each other,
   (b) a diaminosiloxane,
   (c) a diamine, and
   (d) a tetracarboxylic acid dianhydride.

8. A polyamide acid-silicone intermediate according to claim 7, wherein the diaminosiloxane is represented by the formula:

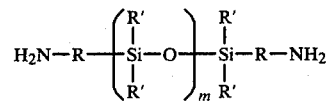

wherein R is a bivalent hydrocarbon group, R' is a monovalent hydrocarbon group, each R and R' may be the same or different, and m is an integer of 1 or more.

9. A polyamide acid-silicone intermediate according to claim 7, wherein the diaminoamide compound is 4,4'-diaminodiphenyl ether-3-carbonamide.

10. A polyamide acid-silicone intermediate according to claim 7, wherein the diamine is 4,4'-diaminodiphenyl ether, 4,4'-diaminodiphenylmethane, or a mixture thereof.

11. A polyamide acid-silicone intermediate according to claim 7, wherein the tetracarboxylic acid dianhydride is 4,4′-benzophenonetetracarboxylic acid dianhydride, pyromellitic acid dianhydride, or a mixture thereof.

12. A polyamide acid-silicone intermediate according to claim 8, wherein the diaminosiloxane is 1,3-bis-(aminopropyl)tetramethyldisiloxane.

13. A process for producing a polyimide-isoindroquinazolinedione-silicone copolymer resin which comprises reacting
(a) a diaminodiamide compound of the formula:

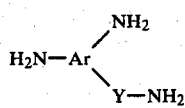

wherein Ar is an aromatic residue, Y is $SO_2$ or CO, and one of amino groups and the Y-$NH_2$ group are positioned at ortho position each other,
(b) a diaminosiloxane,
(c) a diamine, and
(d) a tetracarboxylic acid dianhydride,
in an inert solvent at a temperature of 80° C. or lower to give a polyamide acid-silicone intermediate, which is then subjected to dehydration and ring closure at a temperature of 350° C. or lower.

14. A process for producing a polyamide acid-silicone intermediate which comprises reacting
(a) a diaminodiamine compound of the formula:

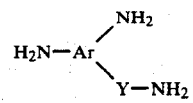

wherein Ar is an aromatic residue, Y is $SO_2$ or CO, and one of amino groups and the Y-$NH_2$ group are positioned at ortho position each other,
(b) a diaminosiloxane,
(c) a diamine, and
(d) a tetracarboxylic acid dianhydride,
in an inert solvent at a temperature of 80° C. or lower.

15. A process according to claim 13 or 14, wherein about one mole of tetracarboxylic acid dianhydride (d) is used per mole of the total of the components (a), (b) and (c).

16. A process according to claim 13 or 14, wherein 5 to 30% by mole of the diaminoamide compound (a) and 0.1 to 50% by mole of the diaminosiloxane (b) are used based on the total amounts of the components (a), (b) and (c).

* * * * *